June 23, 1964     E. T. CARSON     3,138,036

STEERING WHEEL CLAMP

Filed Oct. 5, 1961

*INVENTOR.*
EDWARD TODD CARSON
BY
ATTORNEY.

United States Patent Office 3,138,036
Patented June 23, 1964

3,138,036
STEERING WHEEL CLAMP
Edward Todd Carson, 2515 Edison St., Detroit, Mich.
Filed Oct. 5, 1961, Ser. No. 143,250
3 Claims. (Cl. 74—495)

The purpose of this device is to hold the steering wheel of automobiles and other vehicles in a fixed position. This is accomplished by clamping an arm to the steering wheel of the vehicle where it is held firm by closing the door or window of the vehicle on a belt connected to the arm.

Figure 1:
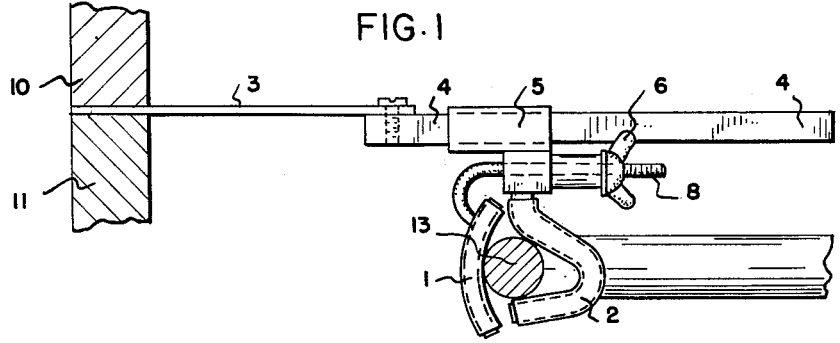
FIG. 1 is a top plan view of the present invention held in position between a vehicle frame and door.
Figure 3:
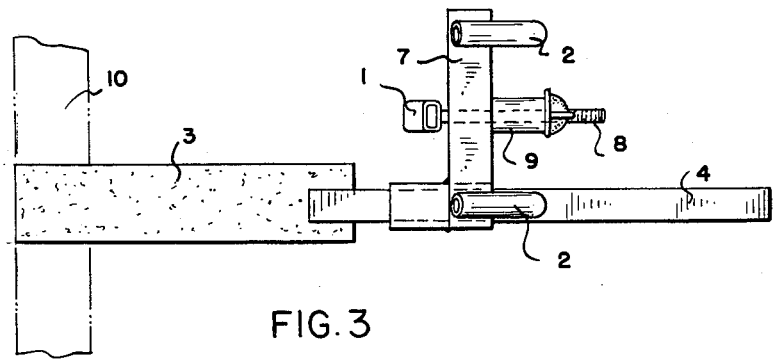
FIG. 3 is a side view of the present invention.
Figure 2:
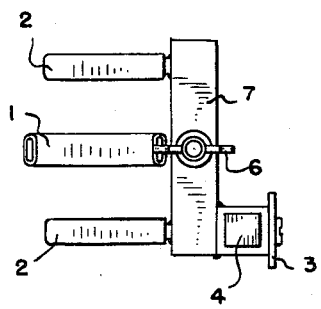
FIG. 2 is an end view of the present invention.

Referring to sketches:

Clamp is attached to steering wheel (13) by cradling wheel in stationary hooks (2) and tightening clamp (1) by turning nut (6) on adjusting shaft (8). Sliding arm (4) is then pulled through shaft (5) to door or window where pressure of closing door or window is exerted on belt (3) attached to arm (4). As shown in FIG. 1, the clamping is achieved by squeezing the belt (3) between the car frame (10) and the car door (11). Similarly, the belt could be clamped between the car window and the adjacent window frame.

In principle, this device extends the radius of the steering wheel to a section or part of the vehicle where it can be secured.

What is claimed is:

1. In a vehicle, the combination comprising: a steering wheel; a vehicle frame; a closure member movable from an open position to a closed position abutting said frame; a clamp attachable to the steering wheel; an arm adjustably carried by said clamp; and an element carried by one end of said arm and adapted to be clamped between said closure member and said frame when said closure member is in closed position, whereby said clamp and adjustable arm effectively extend the radius of said steering wheel to a point close to said closure member, and said element engaged between said closure member and said frame holds said steering wheel in a relatively fixed position.

2. A clamp assembly attachable between a vehicle steering wheel and a closure member, such as a door or window, and the frame of the vehicle for holding the steering wheel in a relatively fixed position during towing or the like, comprising: a clamp attachable to the steering wheel; an arm adjustably carried by said clamp; and a flexible element carried by one end of said arm and adapted to be clamped between said frame and said closure member, when the latter is closed, for securing same and thereby holding the steering wheel in a fixed position.

3. A clamp assembly attachable between a vehicle steering wheel and a closure member, such as a door or window, and the frame of the vehicle for holding the steering wheel in a relatively fixed position during towing or the like, comprising: a bar; a pair of stationary hooks, one fixedly secured at each end of the bar; a clamping element carried by said bar between said stationary hooks; means for moving said clamping element to secure the vehicle steering wheel between it and said stationary hooks; a collar carried at one end of said bar; an arm slidably received in said collar at one end of said arm; and a flexible belt attached at the opposite end of said arm; whereby when said assembly is attached to the steering wheel it effectively extends the radius of the steering wheel to a point close to the closure member and enables the steering wheel to be relatively fixed in position by closing the closure member and thereby clamping the flexible belt between the closure member and the vehicle frame.

References Cited in the file of this patent

UNITED STATES PATENTS

| 1,436,773 | Moore | Nov. 28, 1922 |
| 1,529,595 | Johnson | Mar. 10, 1925 |

FOREIGN PATENTS

| 513,332 | Germany | Nov. 13, 1930 |